(12) United States Patent
Lee et al.

(10) Patent No.: US 8,804,948 B2
(45) Date of Patent: Aug. 12, 2014

(54) HANDHELD DEVICE AND METHOD FOR PROTECTING HANDHELD DEVICE FROM FALLING COLLISION

(71) Applicant: Hon Hai Precision Industry Co., Ltd., New Taipei (TW)

(72) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/726,009

(22) Filed: Dec. 22, 2012

(65) Prior Publication Data

US 2013/0334945 A1     Dec. 19, 2013

(30) Foreign Application Priority Data

Jun. 18, 2012   (TW) .............................. 101121701 A (51) Int. Cl.
*H04M 1/04*     (2006.01)
*H04B 1/38*     (2006.01)
*H05K 5/02*     (2006.01)

(52) U.S. Cl.
CPC ................ *H04B 1/3888* (2013.01); *H05K 5/02* (2013.01)

USPC .......................... 379/437; 379/451; 455/575.8

(58) Field of Classification Search
CPC ......... H04B 1/3888; H05K 5/02; H04M 1/02; H04M 1/0202; H04M 1/04; A45C 2011/002
USPC ....................... 379/428.01, 428.04, 437, 451; 455/575.1, 575.8; 361/679.26, 679.55, 361/679.56; 312/223.1, 223.4; 206/320
See application file for complete search history.

(56) References Cited

U.S. PATENT DOCUMENTS

2004/0087333 A1*   5/2004   Hutchison et al. .......... 455/550.1
2010/0203931 A1*   8/2010   Hynecek et al. ............ 455/575.8
2012/0031788 A1*   2/2012   Mongan et al. ............... 206/320

* cited by examiner

*Primary Examiner* — Tuan D Nguyen
(74) *Attorney, Agent, or Firm* — Novak Druce Connolly Bove + Quigg LLP (57) ABSTRACT

A handheld device includes a specified number of protection components, each protection component includes an actuating unit, an active bracket, a fixed bracket, a holding unit, a spring, and an anti-collision unit. The actuating unit is connected to a body of the handheld device, a first end of the active bracket is connected to the actuating unit, a second end of the active bracket is connected to the holding unit, the fixed bracket is positioned in the holding unit near to the active bracket, and the anti-collision unit is connected to the spring, the anti-collision unit is kept in the holding unit when the protection component is not activated.

13 Claims, 10 Drawing Sheets

HANDHELD DEVICE AND METHOD FOR PROTECTING HANDHELD DEVICE FROM FALLING COLLISION

BACKGROUND

1. Technical Field

Embodiments of the present disclosure relate to safety technology, and particularly to a handheld device and method for protecting a handheld device from a falling collision.

2. Description of Related Art

Touch panels are widely used in handheld devices (e.g., smart phones). However, the touch panels are often damaged when the handheld devices are dropped. Therefore, an efficient method for protecting a handheld device from a falling collision is desired.

DETAILED DESCRIPTION

All of the processes described below may be embodied in, and fully automated via, functional code modules executed by one or more general purpose electronic devices or processors. The code modules may be stored in any type of non-transitory computer-readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

Figure 1:
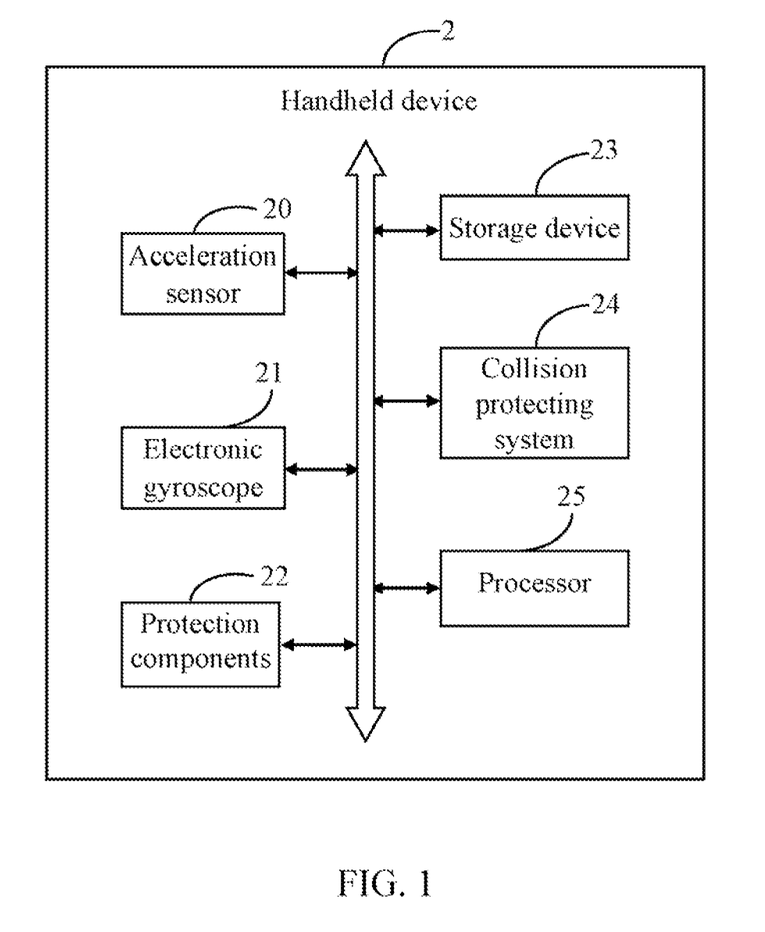
FIG. 1 is a schematic diagram of one embodiment of a handheld device including a collision protecting system.

FIG. 1 is a block diagram of one embodiment of a handheld device 2 including a collision protecting system 24. The handheld device 2 further includes an acceleration sensor 20, an electronic gyroscope 21, a plurality of anti-collision protection components (hereinafter referred to as "protection components") 22, a storage device 23, and at least one processor 25. It should be understood that FIG. 1 illustrates only one example of the handheld device 2 that may include more or fewer components than illustrated, or a different configuration of the various components in other embodiments. In one embodiment, the handheld device 2 may be a smart phone.

In one embodiment, the acceleration sensor 20 is used to detect an acceleration of the handheld device 2 at a preset time interval (e.g., one second). The electronic gyroscope 21 is used to detect a rotating angle of the handheld device 2 at the preset time interval. For example, the acceleration sensor 20 may be a two-axis accelerator, a three-axis accelerator, the electronic gyroscope 21 may be a two-axis gyro or a three-axis gyro.

Figure 4A:
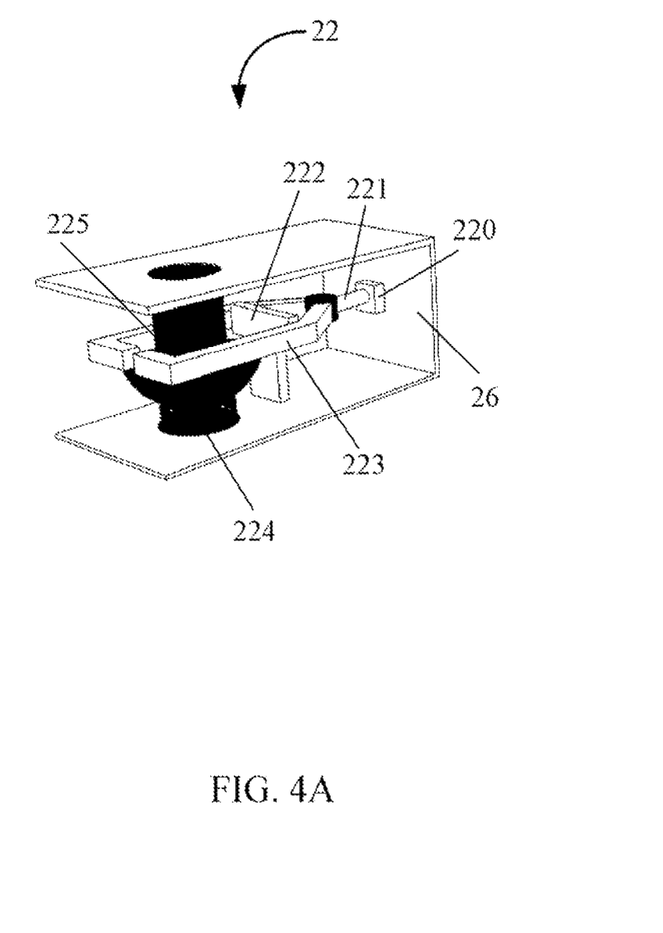
FIG. 4A is a schematic diagram of an example of a protection component.

As shown in FIG. 4A, the protection component 22 includes an actuating unit (e.g., an actuator) 220, an active bracket 221, a fixed bracket 222, a holding unit 223, a spring 224, and an anti-collision unit 225. The actuating unit 220 is connected to a body 26 of the handheld device 2, a first end of the active bracket 221 is connected to the actuating unit 220, a second end of the active bracket 221 is connected to the holding unit 223, the fixed bracket 222 is positioned in the holding unit 223 near to the active bracket 221, and the anti-collision unit 225 is connected to the spring 224, where the anti-collision unit 225 is kept in the holding unit 223 when the protection component 22 is not activated (e.g., the holding unit 223 is unfastened).

Figure 4B:
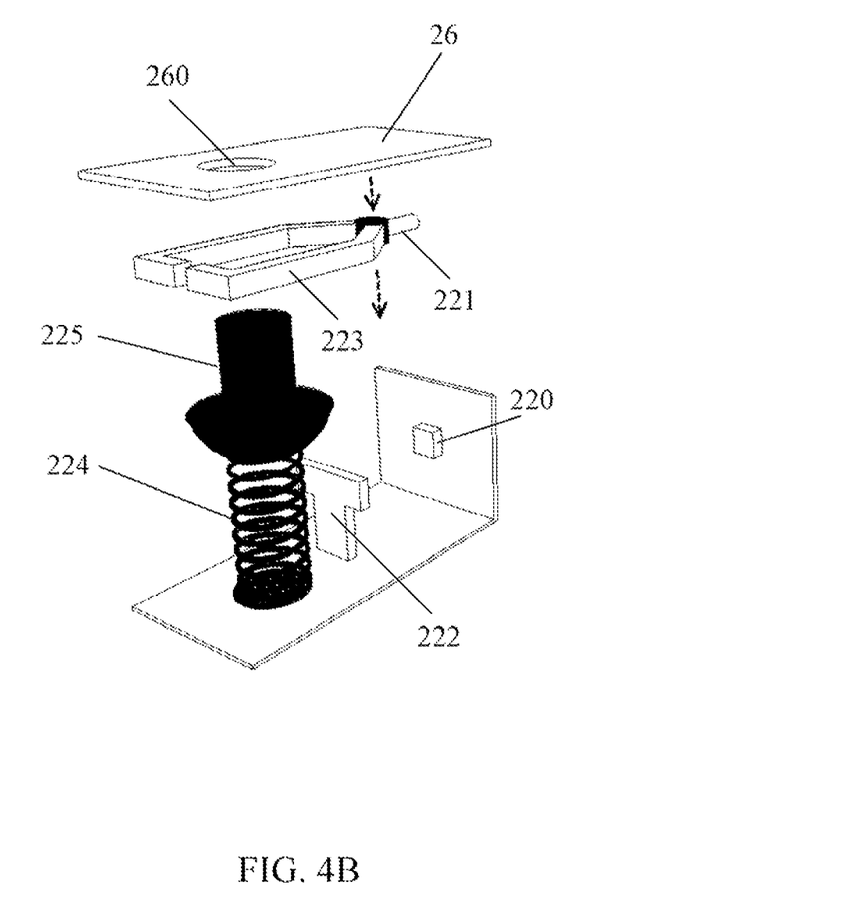
FIG. 4B is a decomposition diagram of the protection component as shown in FIG. 4A.

The body 26 of the handheld device 2 may include, but is not limited to, a front side (e.g., a touch panel of the handheld device 2) and a back side. The anti-collision unit 225 may be produced by an elastic material, such as a rubber. A decomposition diagram of the protection component 22 is shown in FIG. 4B. When the protection component 22 is not activated, the spring 224 is in a compressed state, and the anti-collision unit 225 is kept in the holding unit 223.

Figure 5:
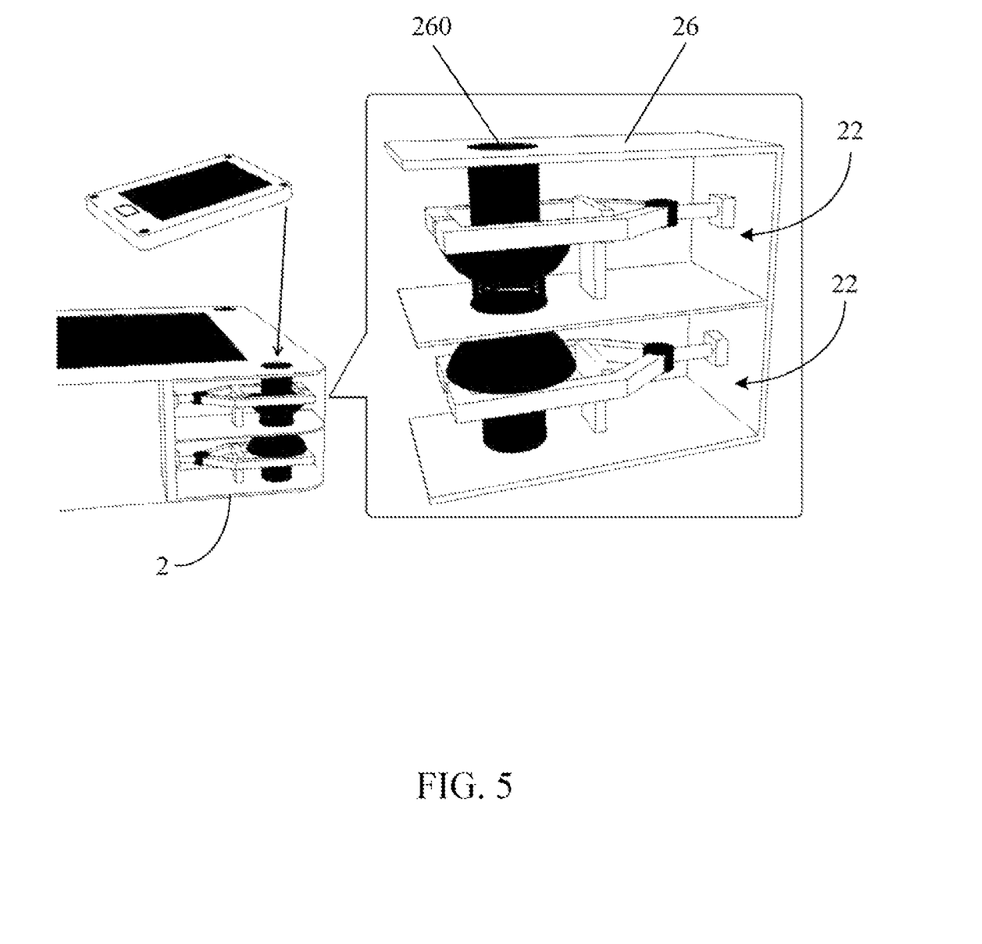
FIG. 5 is a schematic diagram of an example of install positions of the protection components in the handheld device.

In one embodiment, as shown in FIG. 5, the protection components 22 are installed in the four corner of the body 26 of the handheld device 2, and each corner has two protection components 22, for example, one is installed on the front side of the handheld device 2, the other is installed on the back side of the handheld device 2. That is, four protection components 22 are installed on the front side of the handheld device 2, and another four protection components 22 are installed on the back side of the handheld device 2. In other embodiments, a number of the protection components 22 and the install positions of the protection components 22 may be changed according to different shapes of the handheld device 2.

When the collision protecting system 24 detects that the handheld device 2 is in a falling state, the collision protecting system 24 activates each protection component 22 of the handheld device 2 by enabling the actuating unit 220 of each protection component 22, and then the actuating unit 220 controls the active bracket 221 to move towards to the fixed bracket 222 using the actuating unit 220. As the fixed bracket 222 is unmovable, the holding unit 223 is unfastened due to an obstruction on the moving of the active bracket 221. Then, the spring 224 is decompressed when the holding unit 223 is unfastened, and the anti-collision unit 225 springs out from the body 26 of the handheld device 2, to protect the handheld device 2 from a falling collision.

In one embodiment, the collision protecting system 24 may include computerized instructions in the form of one or more programs that are executed by the processor 25 and stored in the storage device 23 (or memory). A detailed description of the collision protecting system 24 will be given in the following paragraphs.

Figure 2:
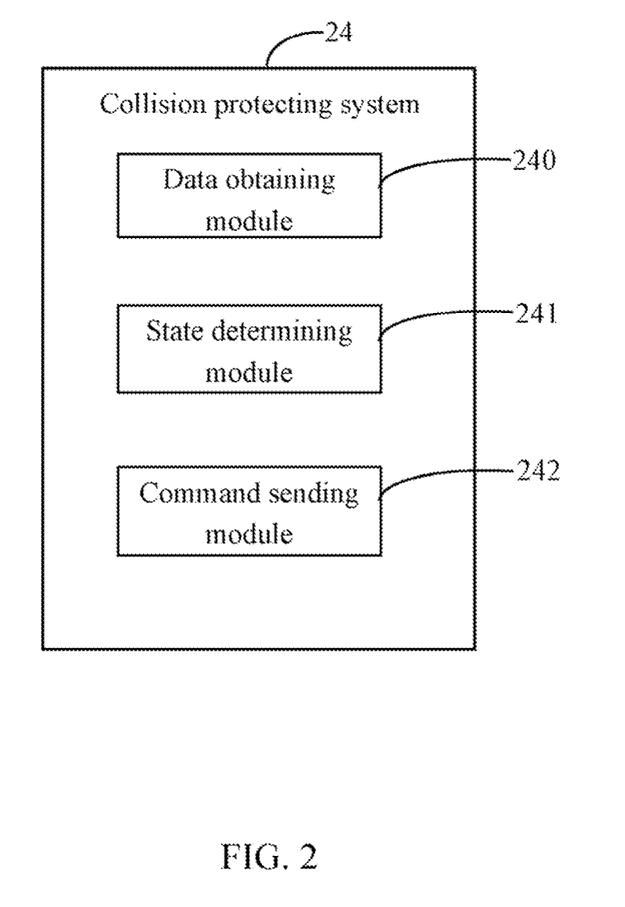
FIG. 2 is a schematic diagram of function modules of the collision protecting system included in the handheld device.

FIG. 2 is a block diagram of function modules of the collision protecting system 24 included in the handheld device 2. In one embodiment, the collision protecting system 24 may include one or more modules, for example, a data obtaining module 240, a state determining module 241, and a command sending module 242. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 3:
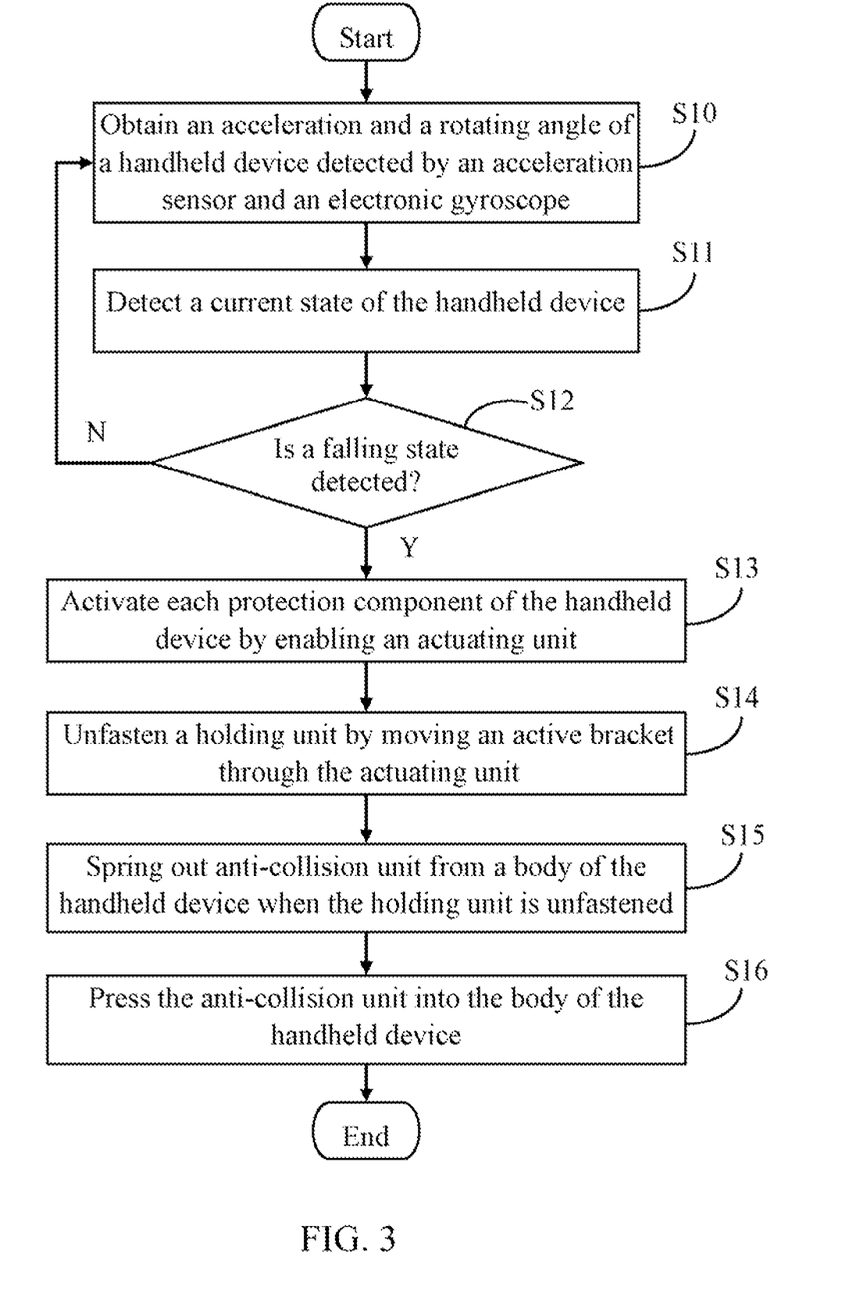
FIG. 3 is a flowchart of one embodiment of a method for protecting the handheld device from a falling collision using a plurality of protection components installed in the handheld device.

FIG. 3 is a flowchart of one embodiment of a method for protecting the handheld device 2 from a falling collision using the protection components 22 installed in the handheld device 2. Depending on the embodiment, additional steps may be added, others removed, and the ordering of the steps may be changed.

In block S10, the data obtaining module 240 obtains an acceleration and a rotating angle of the handheld device 2 as detected by the acceleration sensor 20 and the electronic gyroscope 21 at a preset time interval (e.g., one second).

In block S11, the state determining module 241 detects a current state of the handheld device 2 according to the acceleration and the rotating angle of the handheld device 2. In one embodiment, the current state of the handheld device 2 may be, but is not limited to, a safety state or a falling state.

In one embodiment, if the acceleration of the handheld device 2 is greater than a first preset value, and the rotating angle of the handheld device 2 is greater than a second preset value, the state determining module 241 determines that the current state of the handheld device 2 is the falling state. If the acceleration of the handheld device 2 is less than or equal to the first preset value, or the rotating angle of the handheld device 2 is less than or equal to the second preset value, the state determining module 241 determines that the current state of the handheld device 2 is the safety state. For example, the first preset value may be 6.5 (g), and the second preset value may be 60 degrees.

In other embodiments, the current state of the handheld device 2 may be detected using a single condition (e.g., the acceleration). For example, if the acceleration of the handheld device 2 is greater than the first preset value, the state determining module 241 determines that the current state of the handheld device 2 is the falling state.

In other embodiments, the acceleration sensor 20 may further detect a movement distance per second in a Z-axis of a coordinate system of the handheld device 2. If the movement distance is greater than a third preset value, the state determining module 241 determines that the current state of the handheld device 2 is the falling state. For example, an X-Y plane of the coordinate system is the display screen of the handheld device 2, and the Z-axis is perpendicular to the display screen of the handheld device 2.

In block S12, the state determining module 241 determines whether the falling state has been detected. If the falling state has been detected, the procedure goes to block S13. If the falling state has not detected, the procedure returns to block S10.

In block S13, the command sending module 242 sends an activating command to the actuating unit 220 of each protection component 22 of the handheld device 2, and activates each protection component 22 of the handheld device 2 by enabling the actuating unit 220 of each protection component 22 according to the activating command, and then the actuating unit 220 controls the active bracket 221 to move towards to the fixed bracket 222 using the actuating unit 220.

Figure 6A:
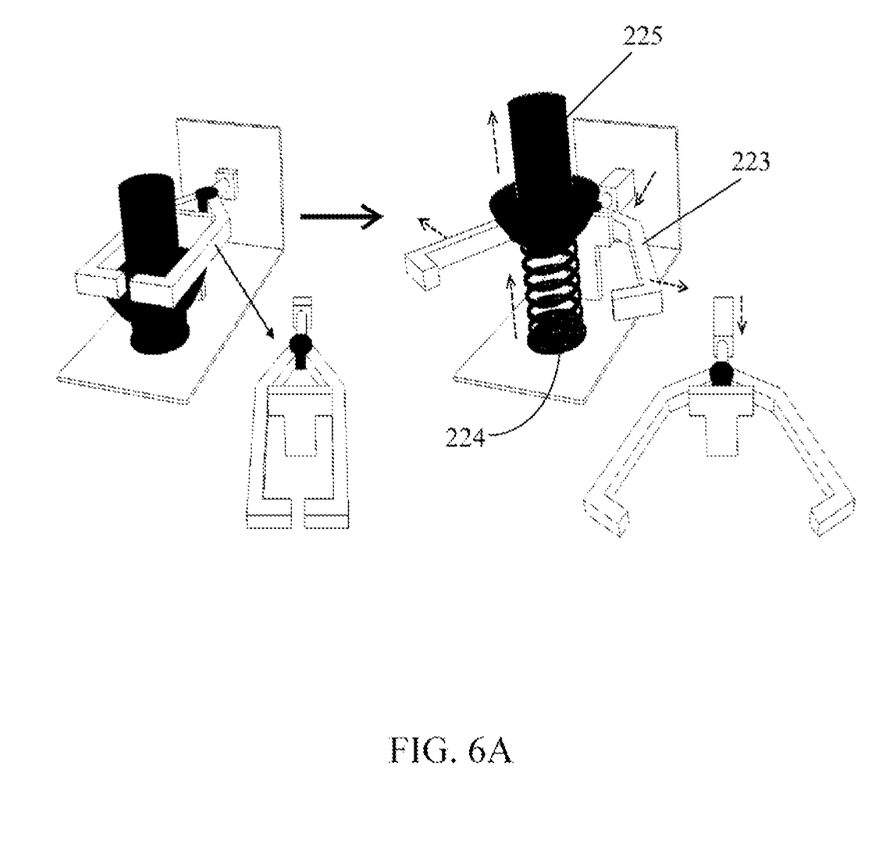
FIGS. 6A-6B are schematic diagrams of examples of an activated state of a protection component.

In block S14, as the fixed bracket 222 is unmovable, the holding unit 223 is unfastened by moving the active bracket 221 towards to the fixed bracket 222 (refers to FIG. 6A).

Figure 6B:
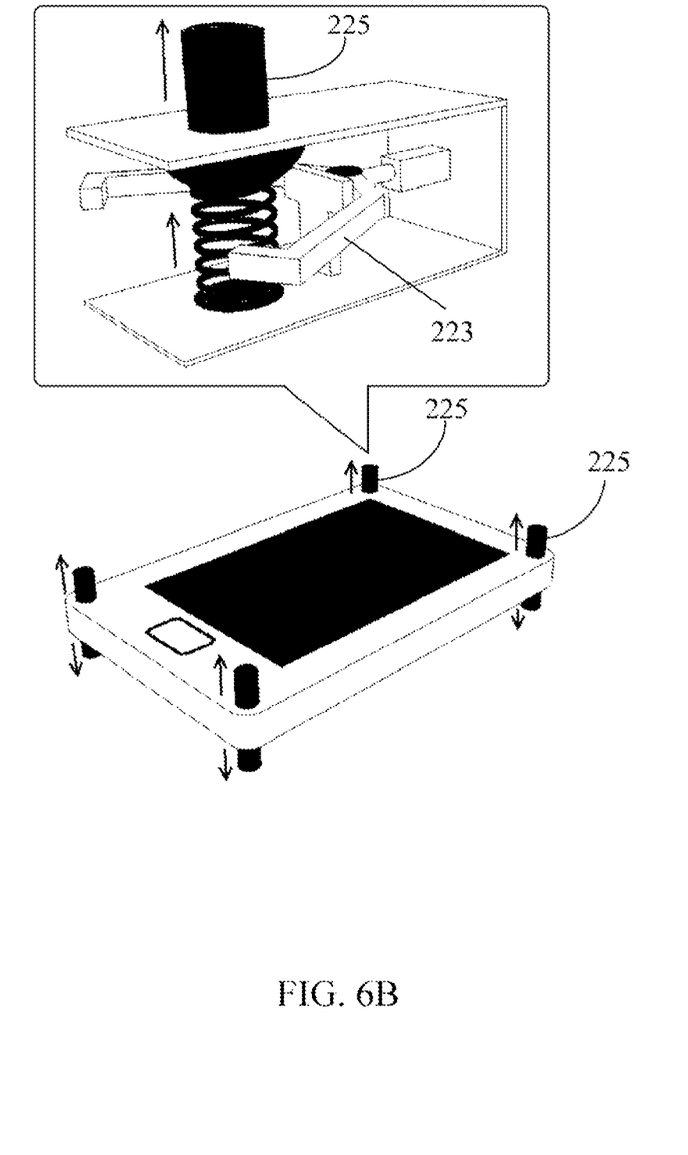

In block S15, the spring 224 is decompressed when the holding unit 223 is unfastened, and the anti-collision unit 225 springs out from the body 26 of the handheld device 2 (refers to FIG. 6B), to protect the handheld device 2 from a falling collision.

Figure 7:
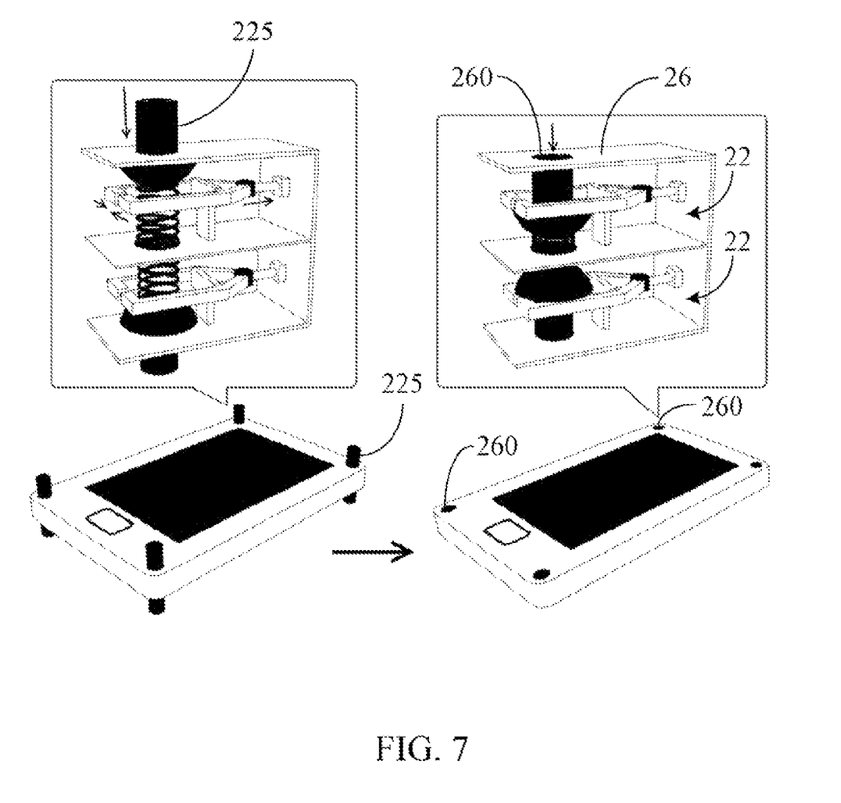
FIG. 7 is a schematic diagram of an example of pressing anti-collision unit of a protection component into a body of the handheld device.

In block S16, the anti-collision unit 225 of each protection component 22 is pressed into the body 26 of the handheld device 2, the spring 224 is compressed and the holding unit 223 is fastened, so that the anti-collision unit 225 is kept in the holding unit 223 again (refers to FIG. 7). The anti-collision unit 225 will spring out from the body 26 of the handheld device 2 when the protection component 22 is activated at the next time.

Figure 8:
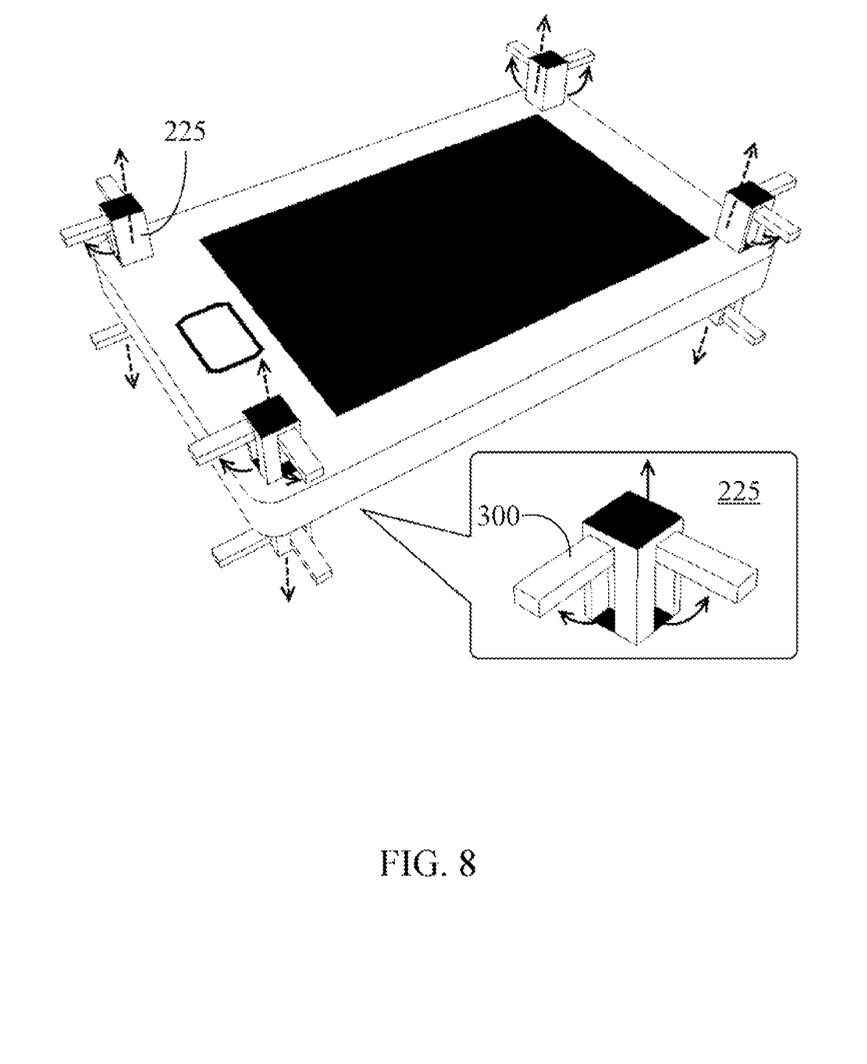
FIG. 8 is a schematic diagram of an example of the anti-collision unit in a second embodiment.

In other embodiments, one or more extended units 300 are installed in the anti-collision unit 225 of each protection component 22. As shown in FIG. 8, the extended units 300 may be extended from the anti-collision unit 225 when the anti-collision unit 225 springs out from the body 26 of the handheld device 2. A contact area between the handheld device 2 and the floor is increased, so that a collision strength between the handheld device 2 and the floor is lessened more effectively. When the anti-collision unit 225 needs to be pressed into the body 26 of the handheld device 2, the extended units 300 is pressed into the anti-collision unit 225 firstly.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A handheld device, comprising:
a plurality of protection components;
each of the protection components comprising an actuating unit, an active bracket, a fixed bracket, a holding unit, a spring, and an anti-collision unit;
the actuating unit connected to the handheld device, a first end of the active bracket connected to the actuating unit, a second end of the active bracket connected to the holding unit, the fixed bracket positioned in the holding unit near to the active bracket, the anti-collision unit connected to the spring, the anti-collision unit kept in the holding unit when the protection component is not activated.

2. The handheld device according to claim 1, wherein the anti-collision unit comprises one or more extended units.

3. The handheld device according to claim 1, wherein the anti-collision unit is produced by an elastic material.

4. The handheld device according to claim 1, wherein the protection components are installed in corners of the handheld device.

5. The handheld device according to claim 1, wherein a number of the protection components is four, and the four protection components are installed on a display screen of the handheld device.

6. The handheld device according to claim 1, wherein a number of the protection components is eight, four protection components are installed on a front side of a display screen of the handheld device, and another four protection components are installed on a back side of the handheld device.

7. A computer-implemented method for protecting a handheld device from a falling collision, the handheld device comprising: a plurality of protection components, each of the protection components comprising an actuating unit, an active bracket, a fixed bracket, a holding unit, and an anti-collision unit connected with a spring, the anti-collision unit kept in the holding unit when the protection component is not activated; the method comprising:
   sending an activating command to the actuating unit of each of the protection components upon the condition that the handheld device is in a falling state;
   activating each of the protection components of the handheld device by enabling the actuating unit of each of the protection components according to the activating command, and controlling the active bracket to move towards to the fixed bracket using the actuating unit;
   unfastening the holding unit by moving the active bracket towards to the fixed bracket;
   springing out the anti-collision unit from the handheld device when the holding unit is unfastened.

8. The method according to claim 7, wherein the anti-collision unit comprises one or more extended units, the extended units extend from the anti-collision unit when the anti-collision unit springs out from the body of the handheld device.

9. The method according to claim 7, wherein the anti-collision unit is produced by an elastic material.

10. The method according to claim 7, wherein the protection components are installed in corners of the handheld device.

11. The method according to claim 7, wherein a number of the protection components is four, and the four protection components are installed on a display screen of the handheld device.

12. The method according to claim 7, wherein a number of the protection components is eight, four protection components are installed on a front side of a display screen of the handheld device, and another four protection components are installed on a back side of the handheld device.

13. The method according to claim 7, wherein the falling state of the handheld device is determined by:
   obtaining an acceleration and a rotating angle of the handheld device detected by an acceleration sensor and an electronic gyroscope of the handheld device;
   determining that the handheld device is in the falling state upon the condition that the acceleration of the handheld device is greater than a first preset value, and the rotating angle of the handheld device is greater than a second preset value.

\* \* \* \* \*